United States Patent [19]
Cox et al.

[11] Patent Number: 5,904,321
[45] Date of Patent: May 18, 1999

[54] DEICING FLUID RECOVERY SYSTEM ESPECIALLY ADAPTED FOR AIRCRAFT DEICING APPARATUS

[75] Inventors: Dennis Michael Cox, Golden, Colo.; Joe Allen Cox, Roanoke, Tex.; Richard Wayne Palmer, Diana, Tex.; James Donald Holbert, Odessa, Tex.

[73] Assignee: Glyrecsys, Inc., Roanoke, Tex.

[21] Appl. No.: 07/932,782

[22] Filed: Aug. 19, 1992

[51] Int. Cl.$^6$ ................................................ B64D 15/06
[52] U.S. Cl. .......................................... 244/134 R; 203/18
[58] Field of Search ........................... 244/134 R, 134 C; 202/500.41; 203/18, 49, DIG. 16

[56] References Cited

U.S. PATENT DOCUMENTS

| | | | |
|---|---|---|---|
| 3,370,636 | 2/1968 | Francis, Jr. et al. | 203/18 |
| 3,378,018 | 4/1968 | Lawter . | |
| 3,450,603 | 6/1969 | Meyers et al. | 203/18 |
| 3,533,395 | 10/1970 | Yaste . | |
| 3,824,177 | 7/1974 | Honerkamp et al. | 203/18 |
| 4,634,084 | 1/1987 | Magnusson . | |
| 4,842,005 | 6/1989 | Hope et al. | 244/134 C |
| 4,986,497 | 1/1991 | Susko | 244/134 C |
| 5,060,887 | 10/1991 | Kean . | |
| 5,102,549 | 4/1992 | George et al. | 244/134 C |
| 5,104,068 | 4/1992 | Krilla et al. . | |

FOREIGN PATENT DOCUMENTS

| | | |
|---|---|---|
| 2343389 | 8/1972 | Germany . |
| 7900331 | 6/1979 | WIPO . |

*Primary Examiner*—Galen L. Barefoot

[57] ABSTRACT

A deicing fluid recovery system for aircraft deicing apparatus includes a storage tank from which a deicing fluid/water deicing mixture is pumped through a line heater to a deicing fluid distribution and collection zone for application to the wings and fuselage of aircraft. Expended deicing fluid is collected in a drainage system incorporated into a concrete or asphalt pad and directed to a sump. Upon accumulation of a sufficient quantity, the diluted used deicing fluid is pumped to a sludge tank. Solids and free water are separated by settling and filtration processes in the sludge tank. The filtered deicing fluid mixture is heated through sequential heat exchangers and directed to a regenerator. The deicing fluid mixture is leaned by a dehydration process in the regenerator in which the mixture is heated and compressed air is injected to exhaust water from a stripping column. The lean deicing fluid flows over an overflow weir into an accumulator. The heated and leaned deicing fluid mixture then is passed back through the sequential heat exchangers, as a heat source, and pumped back into the storage tank for subsequent reuse.

20 Claims, 10 Drawing Sheets

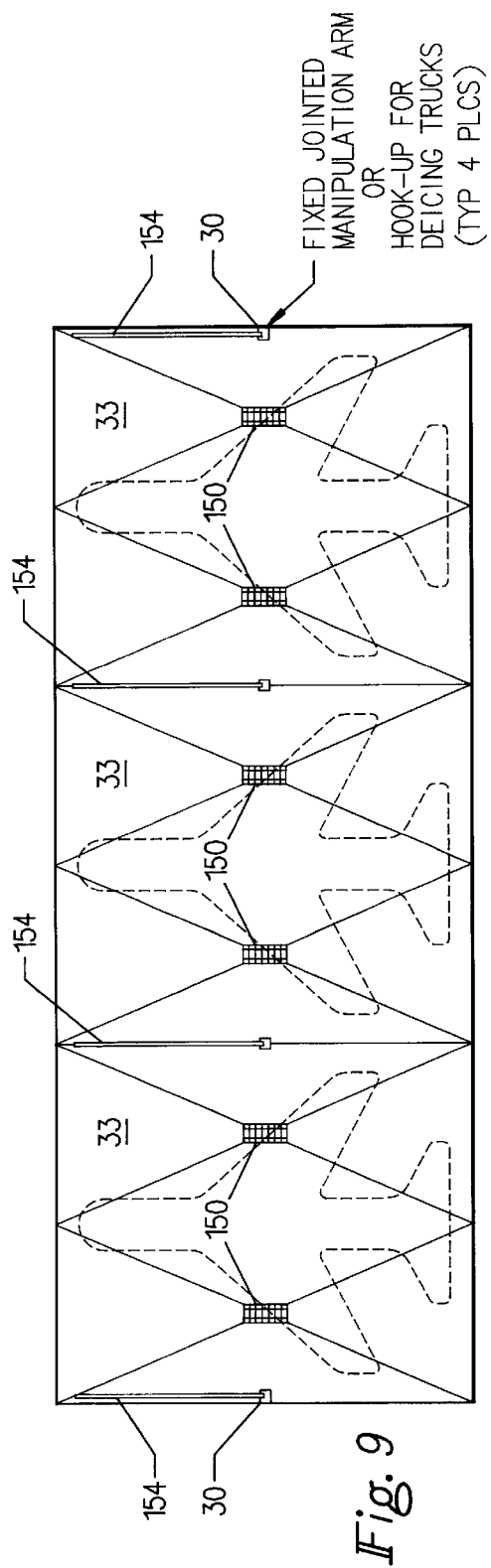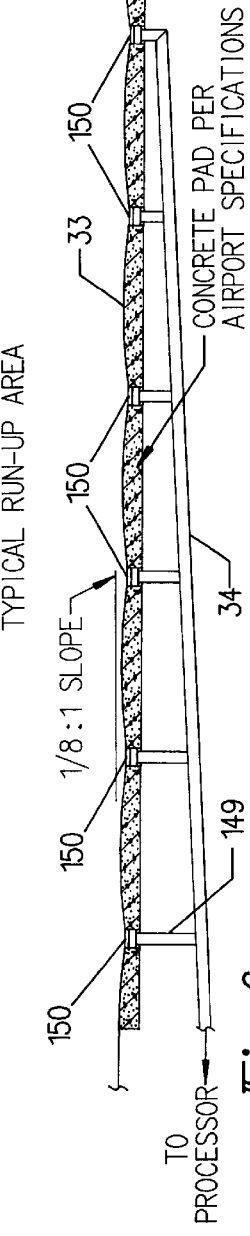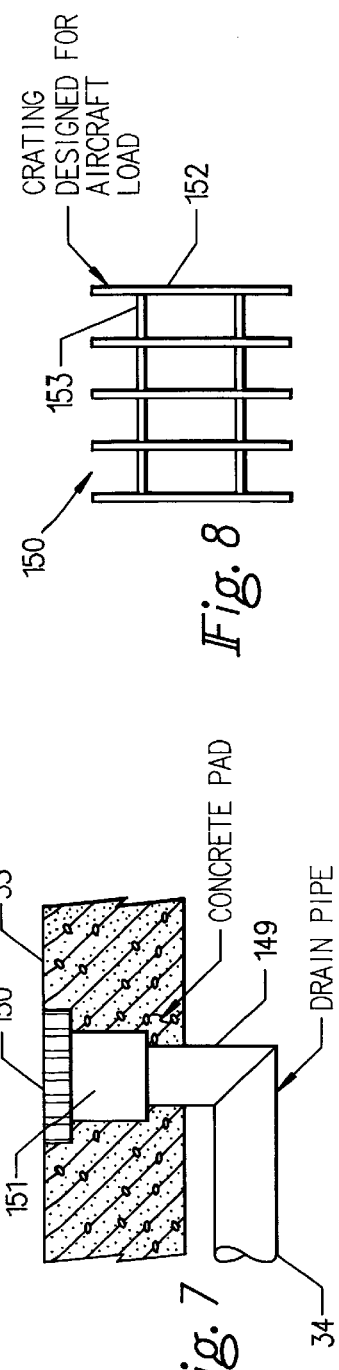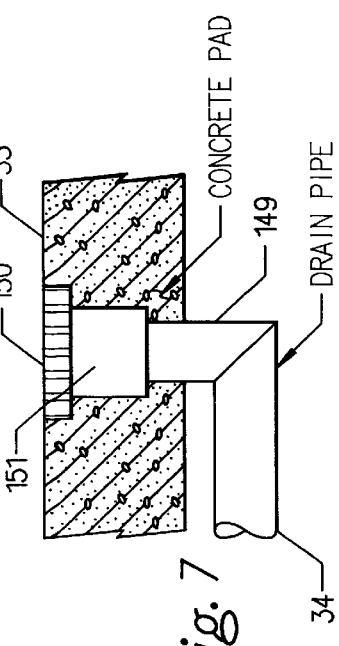

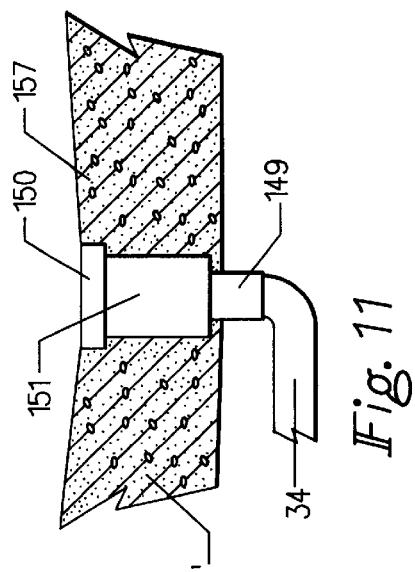
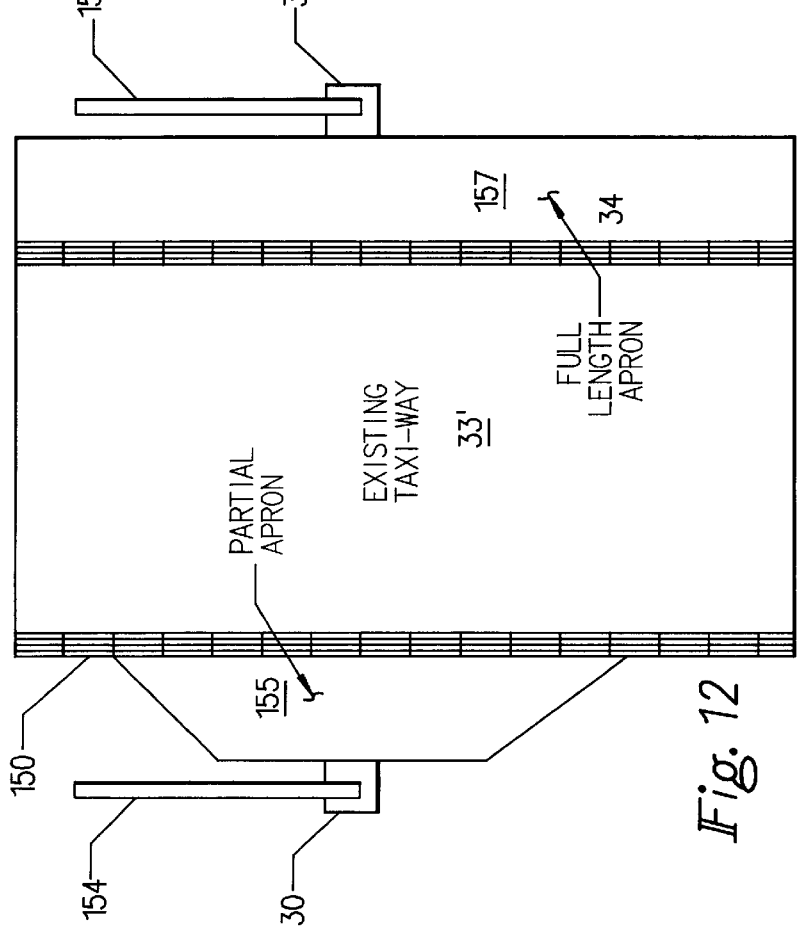
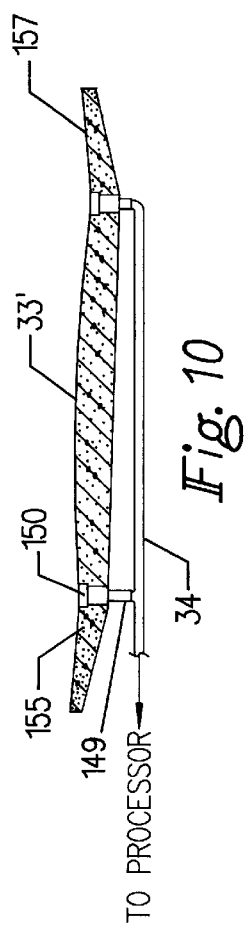

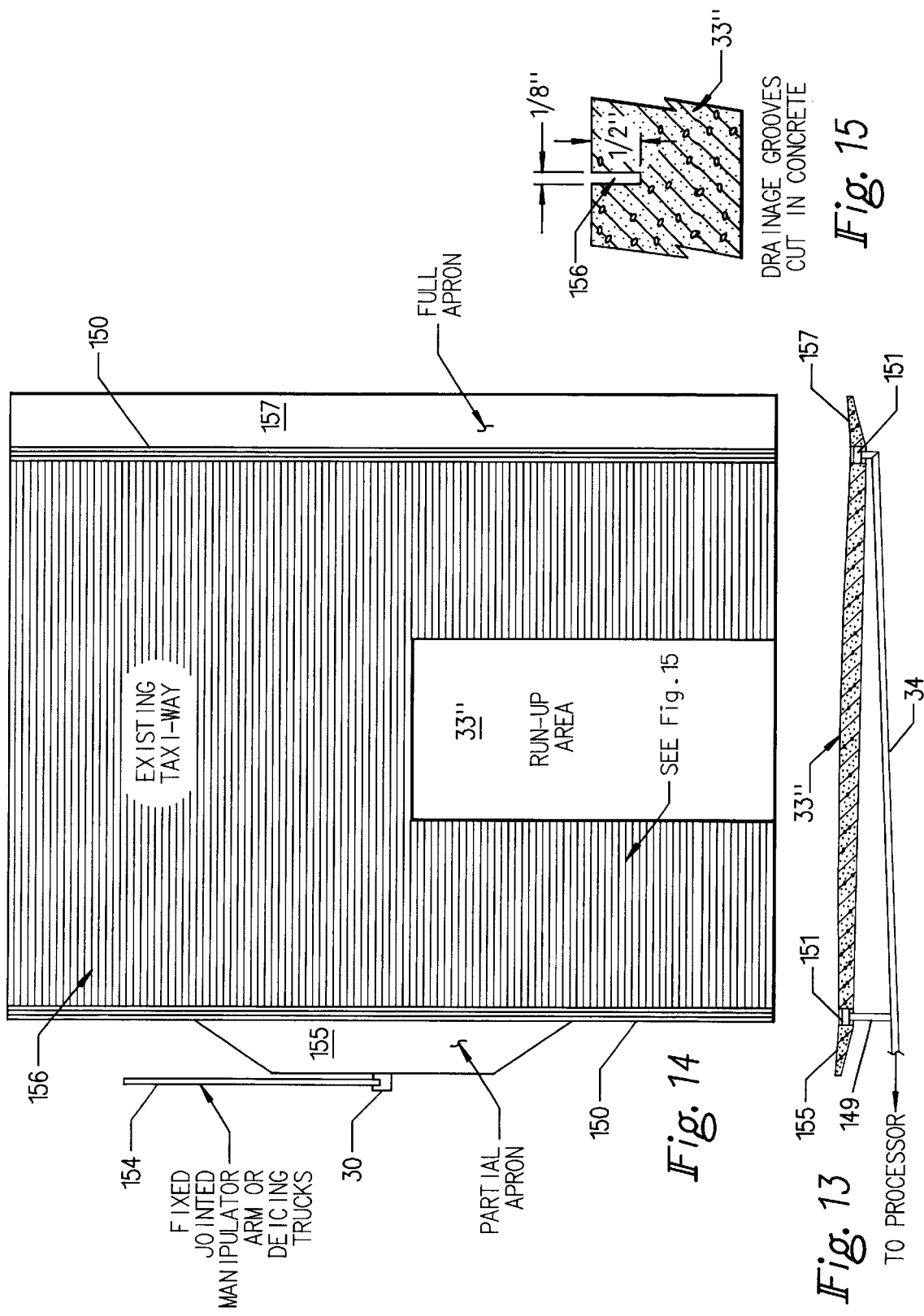

DEICING FLUID RECOVERY SYSTEM ESPECIALLY ADAPTED FOR AIRCRAFT DEICING APPARATUS

BACKGROUND OF THE INVENTION

The present invention relates to deicing fluid recovery systems, and more particularly pertains to an improved deicing fluid recovery system especially adapted for aircraft deicing apparatus.

During inclement weather, ice, freezing precipitation, and snow collect on the wings of aircraft awaiting take-off. Frequently, planes must wait for relatively long time periods prior to take-off, during which time additional ice, freezing precipitation, and snow can accumulate after the initial deicing. Accordingly, repeated deicing is frequently required. Deicing is typically accomplished by the application of a glycol and water mixture via spray nozzles to the wings and fuselage of the aircraft. Such deicing fluids are normally applied through spray nozzles in the gate area from fixed application platforms, or from mobile tanker trucks. After application, the deicing fluid and water mixture is allowed to flow onto the asphalt or concrete runway surface, where it is disposed through natural rainwater drainage channels.

Disposal of deicing fluid in this manner is disadvantageous for several reasons. First, glycol is a material which pollutes rivers and aquifers. Second, human and animal contact with glycol can result in health problems including eye and skin irritation, kidney damage, and even death. Third, glycol is an expensive material, and thus consumption of deicing fluid represents a substantial operating expense to air carriers. Accordingly, there is a considerable interest in and need for a system to recover and reuse glycol to prevent environmental damage, preserve human and animal health, and minimize airline operating costs.

Accumulation of ice on the wings of aircraft during a delay prior to takeoff after an initial deicing operation conducted adjacent the gate is believed to be a contributing factor in several recent accidents. These recent accidents have resulted in proposed Federal Aviation Administration rule changes requiring deicing of aircraft immediately prior to beginning take-off. If implemented, such rule changes would require the provision of facilities adjacent the runway for rapidly deicing aircraft in relatively rapid succession. The provision of such central, defined deicing zones also creates an opportunity for the provision of centralized deicing fluid recovery and recycling facilities.

SUMMARY OF THE INVENTION

In order to achieve these and other objects of the invention, the present invention provides an improved deicing fluid recovery system especially adapted for aircraft deicing apparatus which includes a storage tank holding a deicing fluid/water deicing mixture which is pumped through a line heater to a distribution and collection zone for application to the wings, tail, and fuselage of aircraft through spray nozzles associated with an articulated manipulator arm or a conventional deicing tanker truck. Expended deicing fluid, along with melted ice and snow, is collected in a drainage system incorporated into a concrete or asphalt pad and directed to a sump. Upon accumulation of a sufficient quantity, the diluted used deicing fluid is pumped to a sludge tank. Solids and free water are separated by settling and filtration processes in the sludge tank. The filtered deicing fluid mixture is heated through sequential heat exchangers and directed to a regenerator. The deicing fluid mixture is leaned by a dehydration process in the regenerator, involving the exhaust of water vapor and water condensate in a reflux stripping column, and passed into an accumulator. The heated and leaned deicing fluid mixture is pumped from the accumulator back through the sequential heat exchangers, as a heat source, and then pumped back into the storage tank for subsequent reuse. An electrical control systems includes safety limit sensors for controlling pump and burner operation dependent upon tank fluid levels, temperatures and fluid pressures.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 3A and 3B are schematic diagrams illustrating the control systems of the motors which drive the deicing fluid supply pumps.

FIG. 3D is a schematic diagram illustrating the control system of the motor which drives the recovered deicing fluid sump pump.

FIG. 3F is a schematic diagram illustrating the control system of the motor which drives the regenerated deicing fluid return pump.

FIG. 3H is a schematic diagram illustrating the control system of the motor which drives the make-up pure deicing fluid supply pump.

FIG. 3J is a schematic diagram illustrating the low and high level temperature, pressure, and fluid level sensors utilized in the deicing fluid recovery system of the present invention.

FIG. 6 is a cross sectional view illustrating a runway deicing pad and drainage system for collecting used deicing fluid after application in deicing aircraft.

FIG. 7 is a detail view, partially in cross-section, illustrating an deicing fluid recovery drain pipe mounted in a concrete runway collection pad.

FIG. 8 is a top plan detail view illustrating a drainage grating for allowing drainage of used deicing fluid and for supporting aircraft loads.

FIG. 9 is a diagrammatic top plan view illustrating a typical aircraft deicing run-up area for use with the deicing fluid recovery system according to the present invention.

FIG. 10 is a cross-sectional view illustrating a deicing fluid drainage and recovery system for use with a sloped taxiway.

FIG. 11 is a detail view, partially in cross-section, illustrating a drainage pipe detail for use in the sloped taxiway drainage system of FIG. 10.

FIG. 12 is a top plan view illustrating a sloped taxiway aircraft deicing and deicing fluid recovery area for use with the deicing fluid recovery system of the present invention.

FIG. 13 is a cross-sectional view illustrating a deicing fluid drainage collection system for use with a flat taxiway.

FIG. 14 is a top plan view illustrating an aircraft deicing and deicing fluid collection area for use with a flat taxiway.

FIG. 15 is a detail view illustrating drainage grooves for collecting deicing fluid in the deicing fluid collection taxiway of FIG. 14.

DETAILED DESCRIPTION OF THE PREFERRED EMBODIMENT(S)

Figure 1:
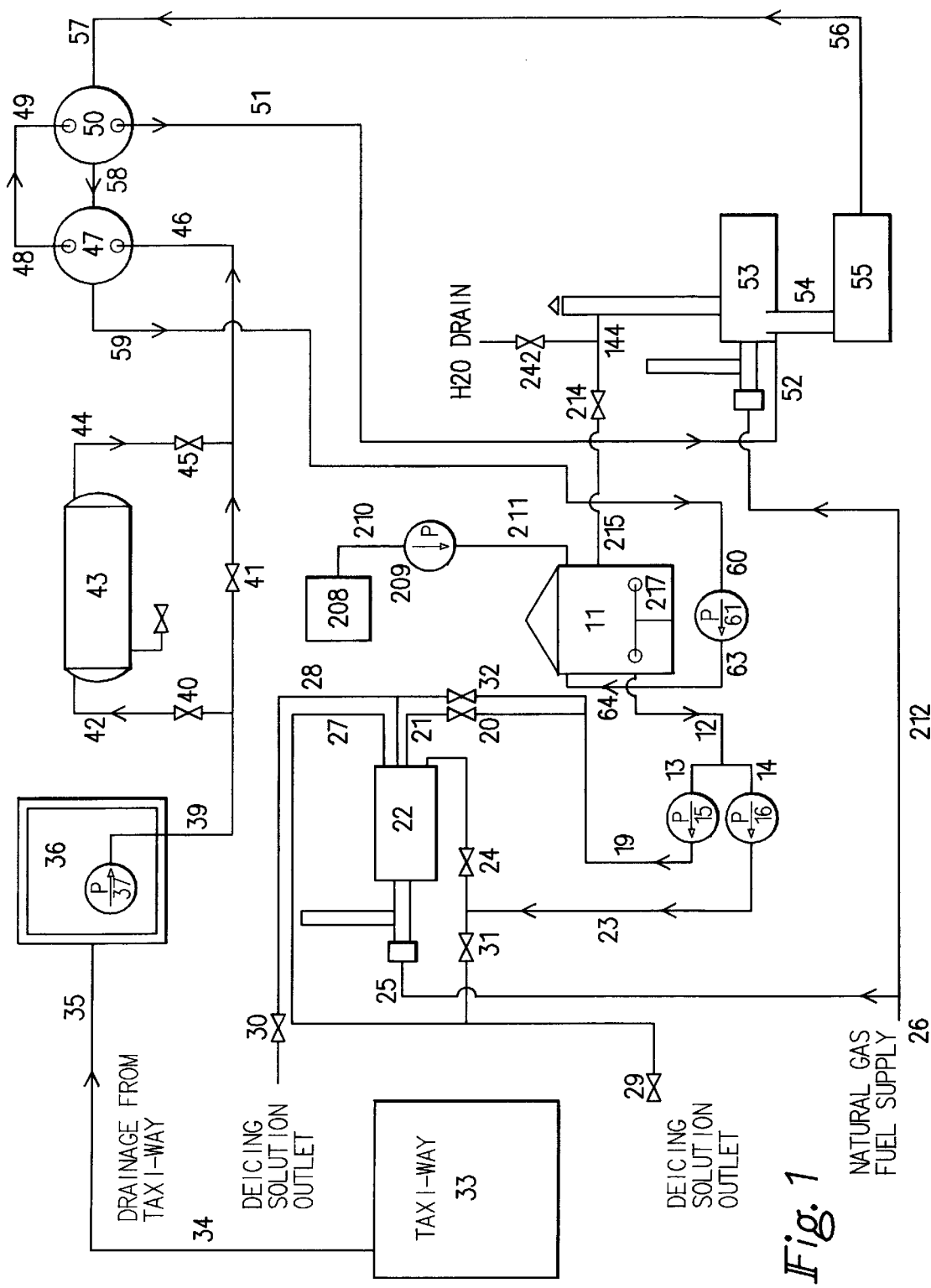
FIG. 1 is a schematic fluid flow diagram illustrating the deicing fluid recovery system according to the present invention.
Figure 3A:
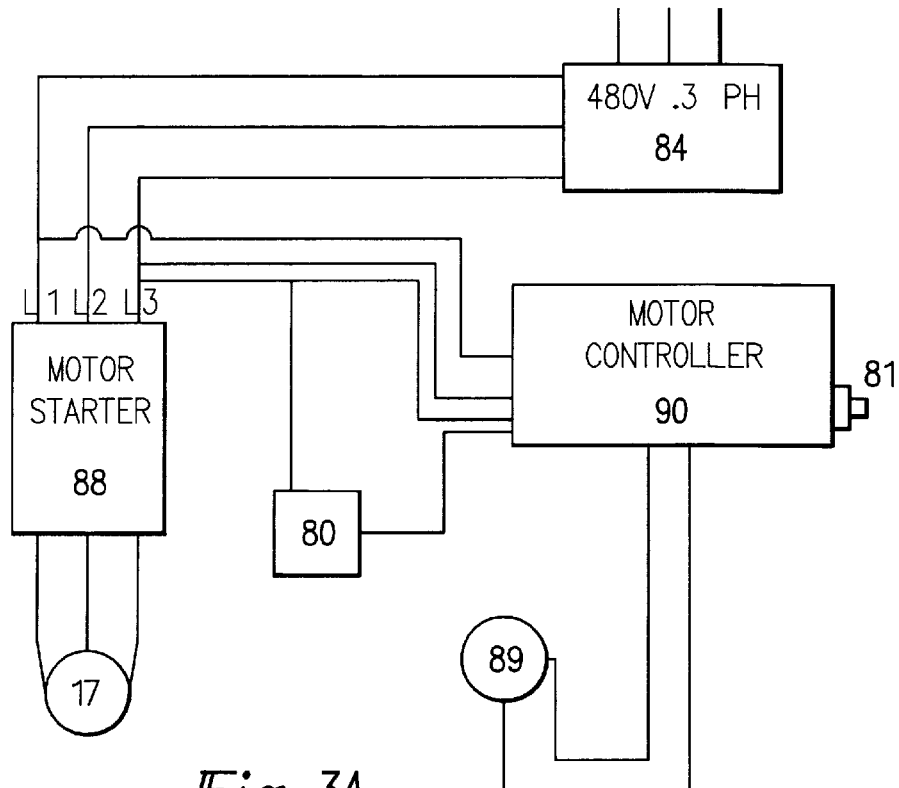
FIGS. 3A, 3B, 3D, 3F, 3H, and 3J are schematic electrical diagrams illustrating various aspects of the control system of the deicing fluid recovery system according to the present invention.
Figure 3B:
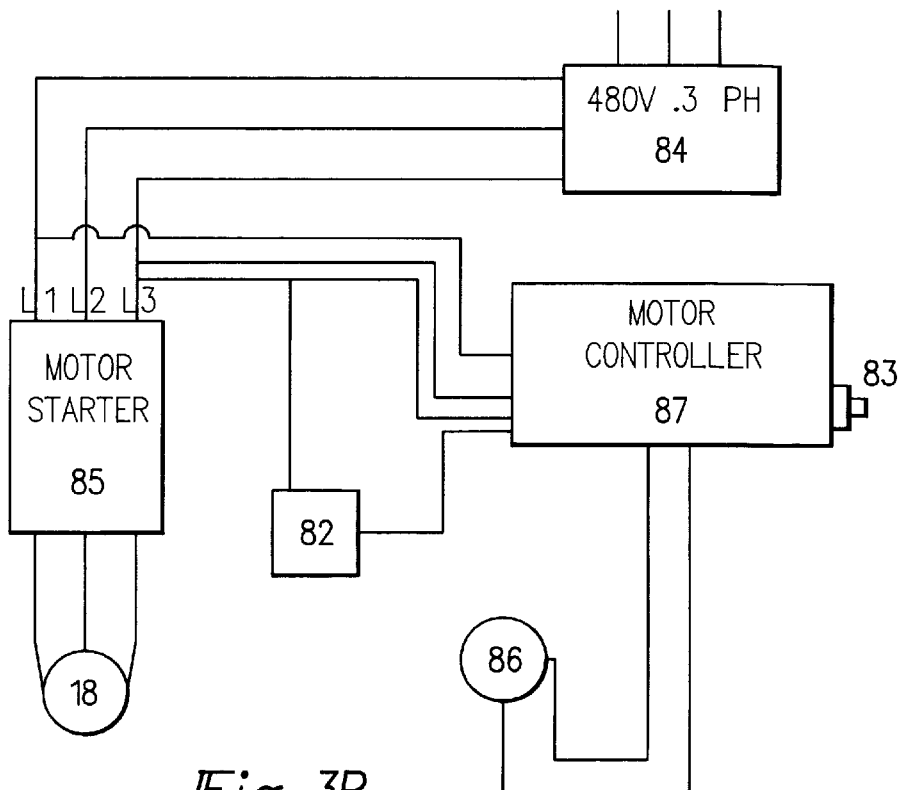

Referring now to the drawings, wherein like reference numerals designate corresponding structure throughout the views, and referring in particular to FIG. 1, the deicing fluid recovery system of the present invention includes a steel welded tank 11 for the storage of a deicing fluid and water solution for application to the wings and fuselage of aircraft to be deiced prior to take off. While ethylene glycol is the currently preferred deicing fluid, other suitable deicing fluids including propylene glycol and alcohol may be employed within the scope of the invention. The terms "deicing fluid mixture" and "deicing fluid solution" are employed in this specification as meaning a mixture of water and at least one fluid capable of removing ice, snow, or frozen precipitation. The deicing fluid mixture storage tank 11 includes an outlet line 12 connected by distribution manifold lines 13 and 14 to respective pumps 15 and 16. Pumps 15 and 16 are driven by respective electric motors 17 and 18 illustrated in FIGS. 3A and 3B. Upon activation of pump 15, the deicing fluid mixture flows through pipeline 19, valve 20, and through an inlet 21 of a line heater 22. Activation of pump 16 similarly causes a flow of the deicing fluid mixture through pipeline 23 and valve 24 into the line heater 22. The line heater 22, to be described in more detail hereinafter, includes an internal burner supplied by natural gas through an inlet 25 from a supply source 26. The deicing fluid mixture is heated to approximately 140° F. before exiting line heater 22 through outlet conduits 27 and 28. The heated deicing fluid and water mixture flows through distribution valves 29 and 30 through deicing application equipment, e.g., an articulated manipulator arm or tanker truck equipped with spray nozzles, onto the wings, tail, and fuselage of an aircraft parked on a concrete pad 33. The heated deicing fluid mixture causes ice to melt from the wings, tail, fuselage, and propeller(s) (if any) of the aircraft, and the now diluted deicing fluid mixture flows through a drain line 34 and an inlet 35 into a sump 36. The term "ice" is used in this specification to mean frost, snow, ice, or freezing precipitation, as employed in FAA regulations relating to deicing. FAA regulations prohibit a captain from taking off with ice on the wings, tail, or propeller(s). Additionally, ice must be removed from the fuselage to enable an accurate determination of takeoff weight. Freezing rain presents the biggest icing problem related to aircraft operation and deicing. Supercooled rain drops fall in liquid form at a temperature below the freezing point of water, and then solidify immediately upon contact with the surface of the aircraft. Such frozen rain is difficult to remove because of its low temperature, thus requiring consumption of relatively large amounts of deicing fluid. Additionally, the transparent nature of the frozen rain makes visual detection difficult.

Figure 3D:
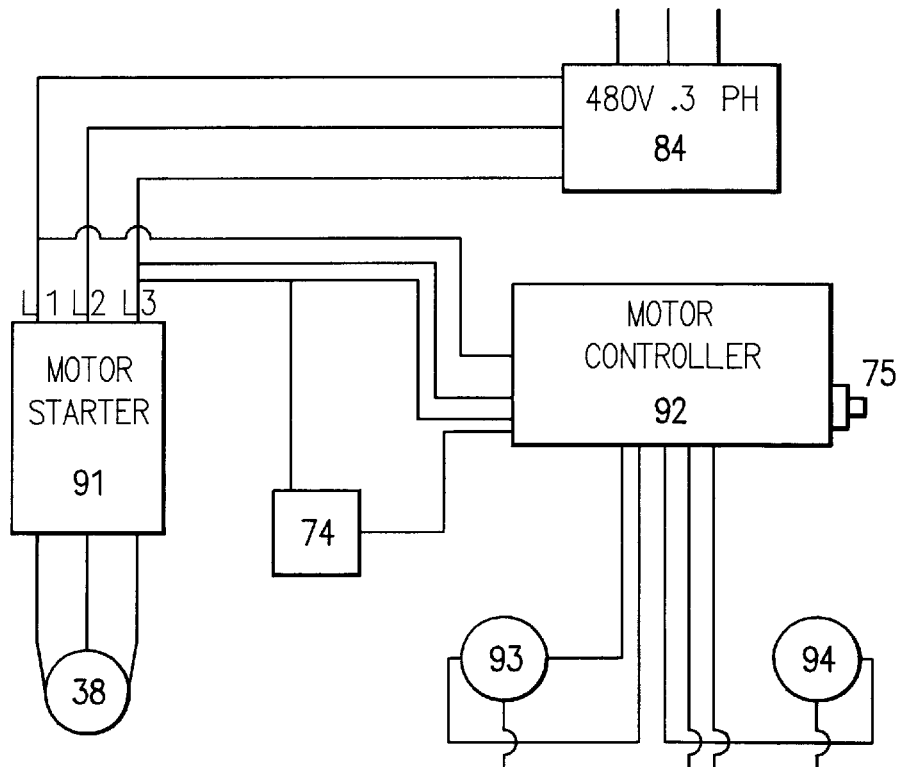
Figure 3F:
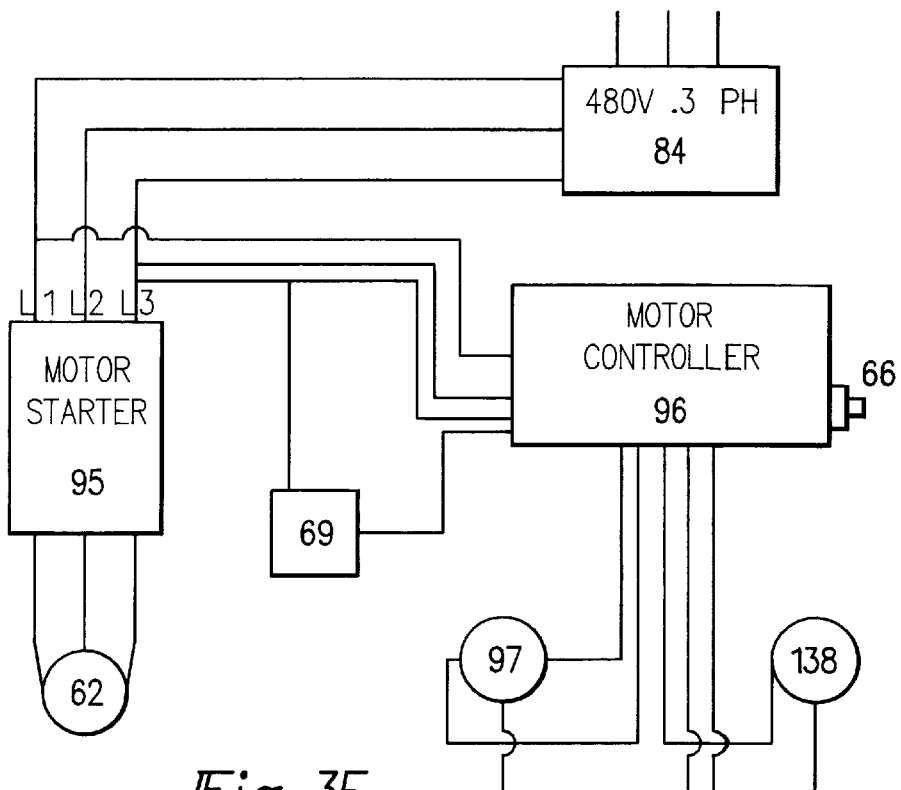
Figure 3H:
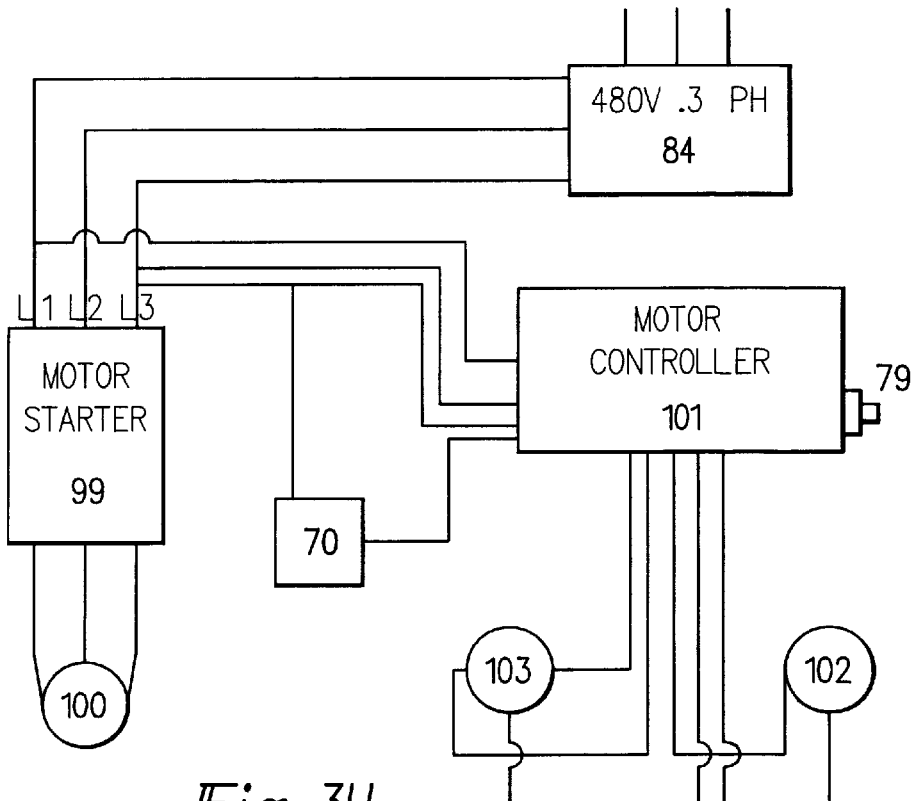

When a predetermined desired quantity of the diluted deicing fluid sludge has been collected in sump 36, the pump 37 is activated by electric motor 38 (FIG. 3D) to pump the sludge through outlet 39, valve 40 and inlet 42 into a sludge tank 43. Solids and free water are separated by a settling and filtration process within the sludge tank 43 and the deicing fluid mixture is then drained through outlet 44 and valve 45 through a inlet 46 and outlet 48 of a first heat exchanger 47 and through inlet 49 and outlet 51 of a second heat exchanger 50. The filtered and preheated deicing fluid mixture then flows through inlet 52 into a deicing fluid regenerator 53. Dehydrated deicing fluid is collected from the regenerator 53 via a conduit 54 and an accumulator 55. The lean deicing fluid then travels through outlet 56 of the accumulator 55 and, as a heat source, into an inlet 57 of heat exchanger 50, through conduit 58 and outlet 59 of a heat exchanger 47, and is then conducted to an inlet 60 of a pump 61. Actuation of the pump 61 via motor 62 (FIG. 3F) causes the lean deicing fluid mixture, now significantly cooled after passage through heat exchangers 50 and 47, through outlet 63 and inlet 64 back into the deicing fluid mixture storage tank 11.

In order to ensure an effective level of deicing fluid concentration in storage tank 11, pure deicing fluid is supplied as required from a make-up tank 208 through outlet 210, pump 209 and inlet 211 into storage tank 11. Make-up deicing fluid from tank 208 is supplied on a demand basis as determined by electronic monitoring of the deicing fluid concentration in storage tank 11, to be described subsequently in greater detail. In a similar manner, make-up water to storage tank 11 is provided by water return line 215 connected to water vapor condensate outlet 144 of the regenerator 53. Valves 242 and 214 are electrically controlled by a concentration sensor in tank 11 to either return the separated water from regenerator 53 to tank 11 or discharge the water to a drain. In addition to conserving water, the recycling of the separated water conserves energy, because it has already been substantially heated in the dehydration process and thus serves to assist in maintaining an elevated temperature level in tank 11.

Accordingly, it can be appreciated that the present invention provides a substantially closed-loop recovery system which allows reuse of essentially all of the initial deicing fluid from the deicing mixture.

With reference now to FIGS. 1, 2, 3A, 3B, 3D, 3F, 3H, and 3J, the electrical control system of the deicing fluid recovery system of the present invention will now be described. A control panel 65 (FIG. 2) centrally locates controls, switches, and indicators associated with the various, components in the fluid system. A "PUMP A" control section of the panel 65 for controlling operation of deicing fluid mixture supply pump 15 (FIG. 1) includes a switch 80 which, when moved to the "ON" position, applies power from a 480 volt-3 phase power supply 84 (FIG. 3A) through lugs L1, L2, and L3 to motor starter 88, motor 17, and also to motor controller 90. The controller 90 sends a signal through high pressure switch 89, which opens to interrupt the signal in the event a predetermined pressure level in pipeline 19 (FIG. 1) is exceeded. Upon such a high pressure occurrence, a so-called "tattletale" 81 will lock out power until the malfunction is corrected and tattletale 81 is reset. A tattletale is a circuit breaker which possesses a red reset button which pops out when the breaker opens. The reset button must be manually depressed to close the breaker.

An essentially identical control system for deicing fluid mixture supply pump 16 includes a switch 82 (FIG. 2) which, when moved to the "ON" position, applies power from a 480 volt-3 phase power supply 84 (FIG. 3B) through lugs L1, L2, and L3 to motor starter 85, motor 18, and also to motor controller 87. The controller 87 sends a signal through high pressure switch 86, which opens to interrupt the signal in the event a predetermined pressure level in pipeline 23 (FIG. 1) is exceeded. Upon such a high pressure occurrence, a tattletale 83 will lock out power until the malfunction is corrected and tattletale 83 is reset.

A control section for sump pump 37 of panel 65 (FIG. 2) includes a switch 74 which, when moved to the "ON" position, applies power from a 480 volt-3 phase power supply 84 (FIG. 3D) through lugs L1, L2, and L3 to motor starter 91, motor 38, and also to motor controller 92. The controller 92 sends a signal through high pressure switch 94. Pressure switch 94 opens to interrupt the signal in the event a predetermined pressure level in pipeline 39 (FIG. 1) is exceeded. Upon such a high pressure occurrence, a tattletale 75 will lock out power until the malfunction is corrected and tattletale 75 is reset. The high liquid level controller 93 is disposed in sump 36 (FIG. 1) and sends a signal to controller 92 when the liquid level in sump 36 rises to a predetermined level. Controller 92 allows operation of pump drive motor 38 only upon existence of the signal from level controller 93.

A control section for deicing fluid return pump 61 of panel 65 (FIG. 2) includes a switch 69 which, when moved to the "ON" position, applies power from a 480 volt-3 phase power supply 84 (FIG. 3F) through lugs L1, L2, and L3 to motor starter 95, motor 62, and also to motor controller 96. The controller 96 sends a signal through liquid level controller alarm 138 disposed in accumulator tank 55 (FIG. 1). The level controller alarm 138 opens to interrupt the signal in the event fluid level in accumulator tank 55 falls below a predetermined level. Upon such a low fluid level occurrence, a tattletale 66 will lock out power until the malfunction is corrected and tattletale 66 is reset. The high liquid level controller 97 is also disposed in accumulator tank 55 (FIG. 1) and sends a signal to controller 96 when the liquid level in tank 55 rises to a predetermined level. Controller 96 allows operation of pump drive motor 62 only upon existence of the signal from level controller 97.

A control section for deicing fluid make-up pump 209 of panel 65 (FIG. 2) includes a switch 70 which, when moved to the "ON" position, applies power from a 480 volt-3 phase power supply 84 (FIG. 3H) through lugs L1, L2, and L3 to motor starter 99, motor 100, and also to motor controller 101. The controller 101 sends a signal through liquid level controller alarm 102 disposed in make-up tank 208 (FIG. 1). The level controller alarm 102 opens to interrupt the signal in the event fluid level in make-up tank 208 falls below a predetermined level. Upon such a low fluid level occurrence, a tattletale 79 will lock out power until the malfunction is corrected and tattletale 79 is reset. A solution purity monitor 103, disposed in deicing fluid mixture storage tank 11 (FIG. 1), sends a signal to controller 101 when the liquid in tank 11 reaches a predetermined minimum concentration level of deicing fluid relative to water. Controller 101 allows operation of pump drive motor 100 only upon existence of the signal from level controller 103. Solution purity monitor 103 is also operative to close recycled water drain valve 212 (FIG. 1) and open make-up water supply valve 214 to supply make-up water from condensate outlet 144 of regenerator 53 when the liquid in tank 11 reaches a predetermined maximum concentration level of deicing fluid relative to water. A stirring mechanism 217 may be provided in tank 11 to ensure homogenous mixing of the deicing fluid and water.

Figure 2:
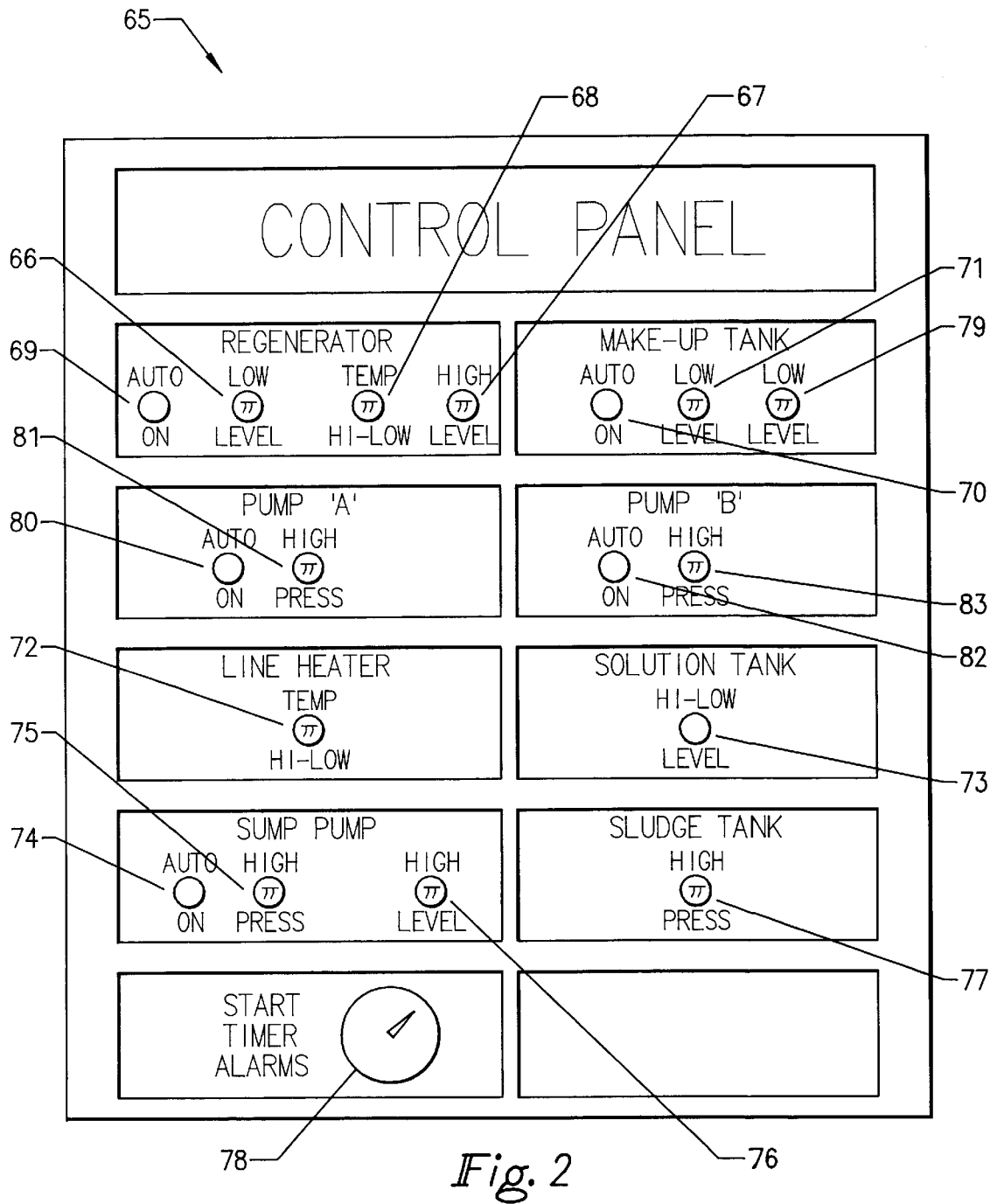
FIG. 2 is a plan view illustrating the electrical control panel for the deicing fluid recovery system of the present invention.
Figure 3J:
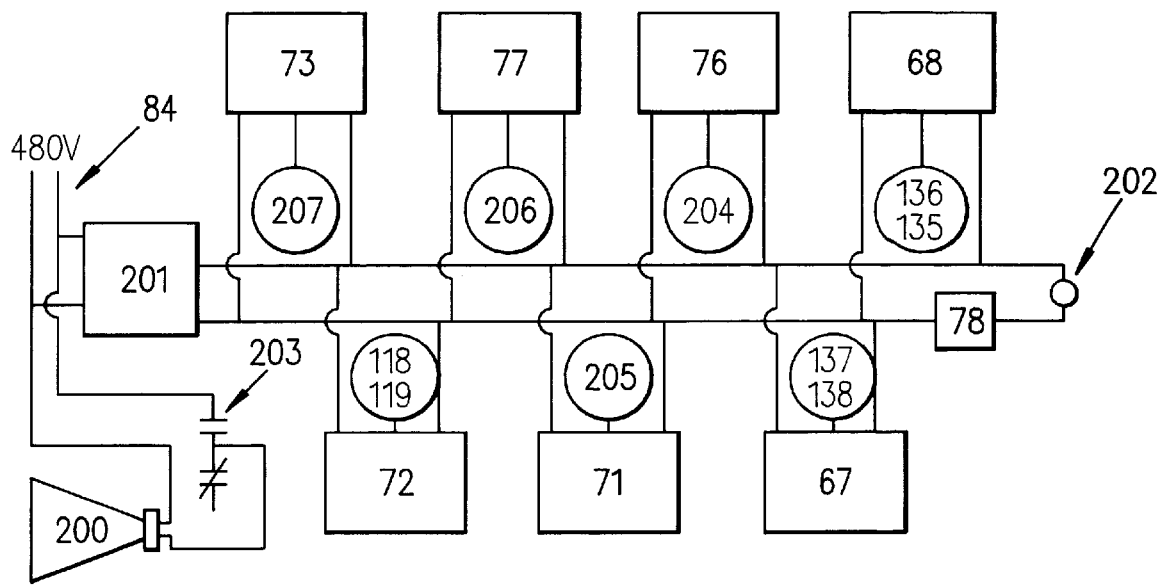

With reference to FIGS. 2 and 3J, the control system possesses an audible alarm system for warning operating personnel of malfunction conditions occurring in the various fluid flow loop components which includes a 480 volt to 24 volt transformer 201 which provides power from supply 84 to alarm 200, when any of the various malfunction conditions described above occur. To override the various automatic shutdown tattletales, a start timer 78 is initially set for fifteen minutes to allow sufficient used and diluted deicing fluid mixture to collect in sump 36 (FIG. 1). A 24 volt signal is sent from transformer 201 and provided to tattletales 73, 77, 76, 68, 72, 71, and 67. If any of the associated sensors 207, 206, 204, 136, 135, 137, 138, 205, 118, or 119 sense a warning, a signal will be sent to engage coil 202 and close contacts 203, sounding alarm 200. The sensor sensing the warning condition will trip the associated tattletale resulting in the sounding of alarm 200 until the malfunction is corrected.

The various motor controllers, pressure switches, and tattletales described above are available from Frank W. Murphy Manufacturer, Inc., having a home office in Tulsa, Okla. The model numbers of the various components are listed in the following table.

| Reference No. | Component | Type | Model No. |
| --- | --- | --- | --- |
| 207 | sensor | level low warning level high warning | OPL-H |
| Monitors deicing fluid and water mixture level in storage tank 11. | | | |
| 206 | sensor | pressure high warning | OPC-C |
| Monitors pressure in sludge tank 43. | | | |
| 204 | sensor | level high warning | OPL-H |
| Monitors liquid level in sump 36. | | | |
| 135 | Sensor | temperature low warning | SPL-C |
| 136 | Sensor | temperature high warning | SPL-C |
| Monitors temperature in regenerator 53. | | | |
| 137 | sensor | level high warning | L1200 |
| 138 | sensor | level low warning | L1200 |
| Monitors liquid level in accumulator tank 55. | | | |
| 205 | sensor | level low warning | OPL-H |
| Monitors liquid level in make-up tank 208. | | | |
| 118 | sensor | temperature low warning | SPL-C |
| 119 | sensor | temperature high warning | SPL-C |
| Monitors temperature in line heater 22. | | | |
| 87, 90 | motor controllers | | TR 7207 |
| 92, 96, 101 | motor controllers | | TR 1761 |
| 86, 89 | high pressure switch | | OPL-H |
| 66, 75, 79, 81, 83 | tattletales | | Model 169 |
| 67, 68, 71, 72, 73, 76, 77 | tattletales | | Model 169 DH |
| 93, 97 | high liquid level controllers | | OPL-H |
| 94 | high pressure switch | | OPL-C |
| 102, 138 | liquid level controller alarm | | L-1200 |

Figure 4:
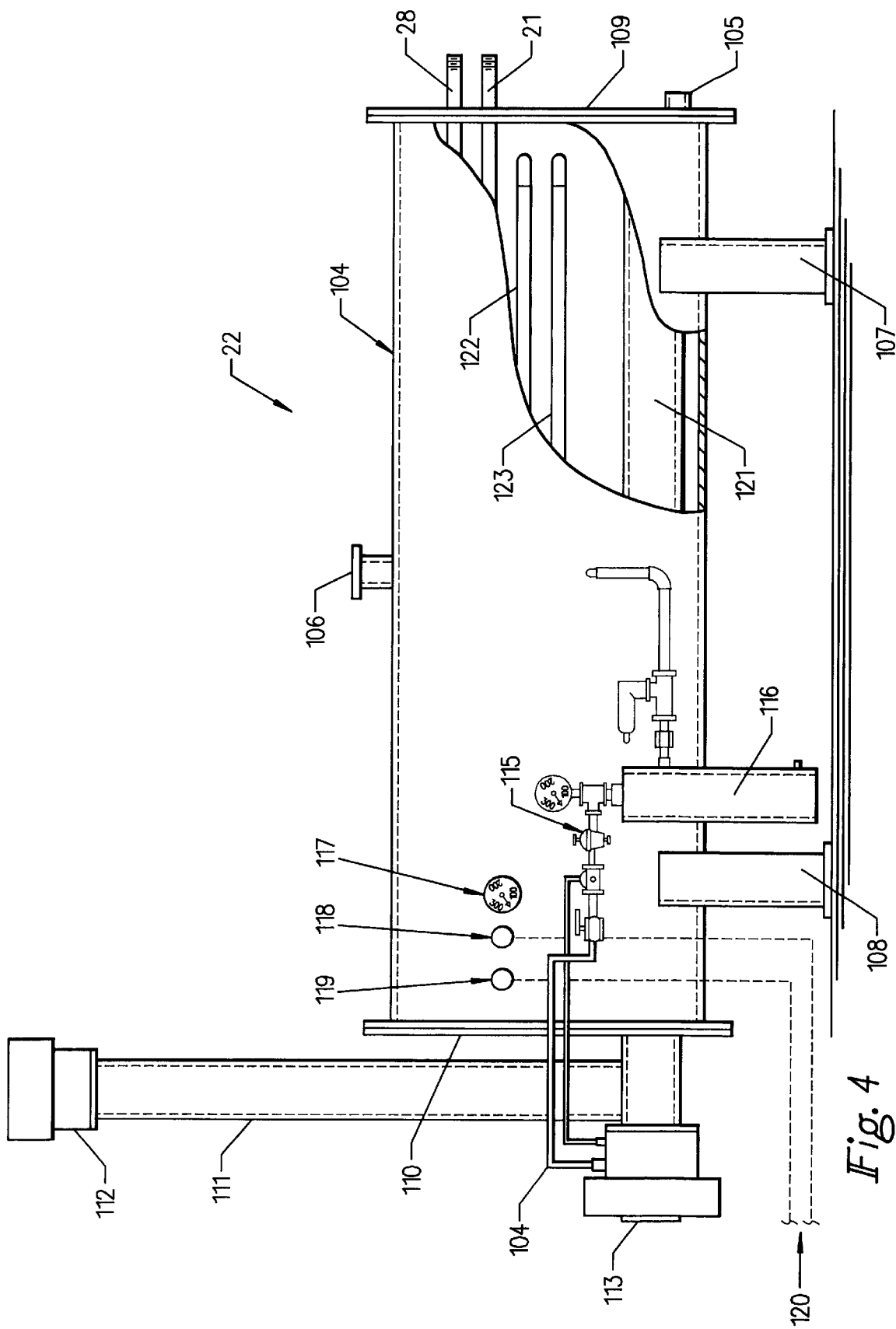
FIG. 4 is a side elevational view, partially cut away, illustrating the line heater component of the deicing fluid recovery system according to the present invention.

FIG. 4 illustrates a side elevational view of the line heater 22, partially cut away to illustrate the interior components thereof. The line heater 22 includes a substantially hollow cylindrical tank or vessel 104 possessing two deicing fluid inlets and two deicing fluid outlets. One pair of the deicing fluid inlets and outlets are illustrated at 21 and 28, respectively. The tank 104 includes a drain plug 105 and a fill cap 106 such that the tank 104 may be conveniently filled with water or other heat storage fluid material. The line heater 22 includes a plurality of support legs 107 and 108 for mounting the line heater to the floor of an equipment room or other similar environment. The tank portion 104 of the line heater 22 terminates at opposite substantially circular end plates or bulk heads 109 and 110. A smokestack 111 for venting exhaust gases terminates at a down draft diverter 112 provided to prevent interruption of the combustion process during adverse ambient wind conditions. Natural gas burner 113 is connected to a fuel gas supply line 104 via a manifold 115 and conventional gas pressure control and regulating equipment and a fuel gas scrubber 116 connected to an inlet 25 from a natural gas supply source 26 (FIG. 1). A temperature gauge 117 is provided to allow direct manual observation of the operating temperature of the heater 22. Low temperature 118 and high temperature 119 warning sensors are connected via control lines 120 to tattletale 72 of the control panel 65 illustrated in FIG. 2. The gas burner 113 heats air within a metal fire tube 121 extending longitudinally within the tank 104. The tube 121 transfers heat to the surrounding water or other heat transfer medium within the tank 104. The heat is then transferred to a plurality of tubes 122 and 123 traversing in loop fashion through the interior of the tank 104. Accordingly, it can be appreciated that the deicing fluid mixture is rapidly heated as it passes through the repeated tubular loops within the tank 104 prior to exiting at outlet conduit 28.

Figure 5:
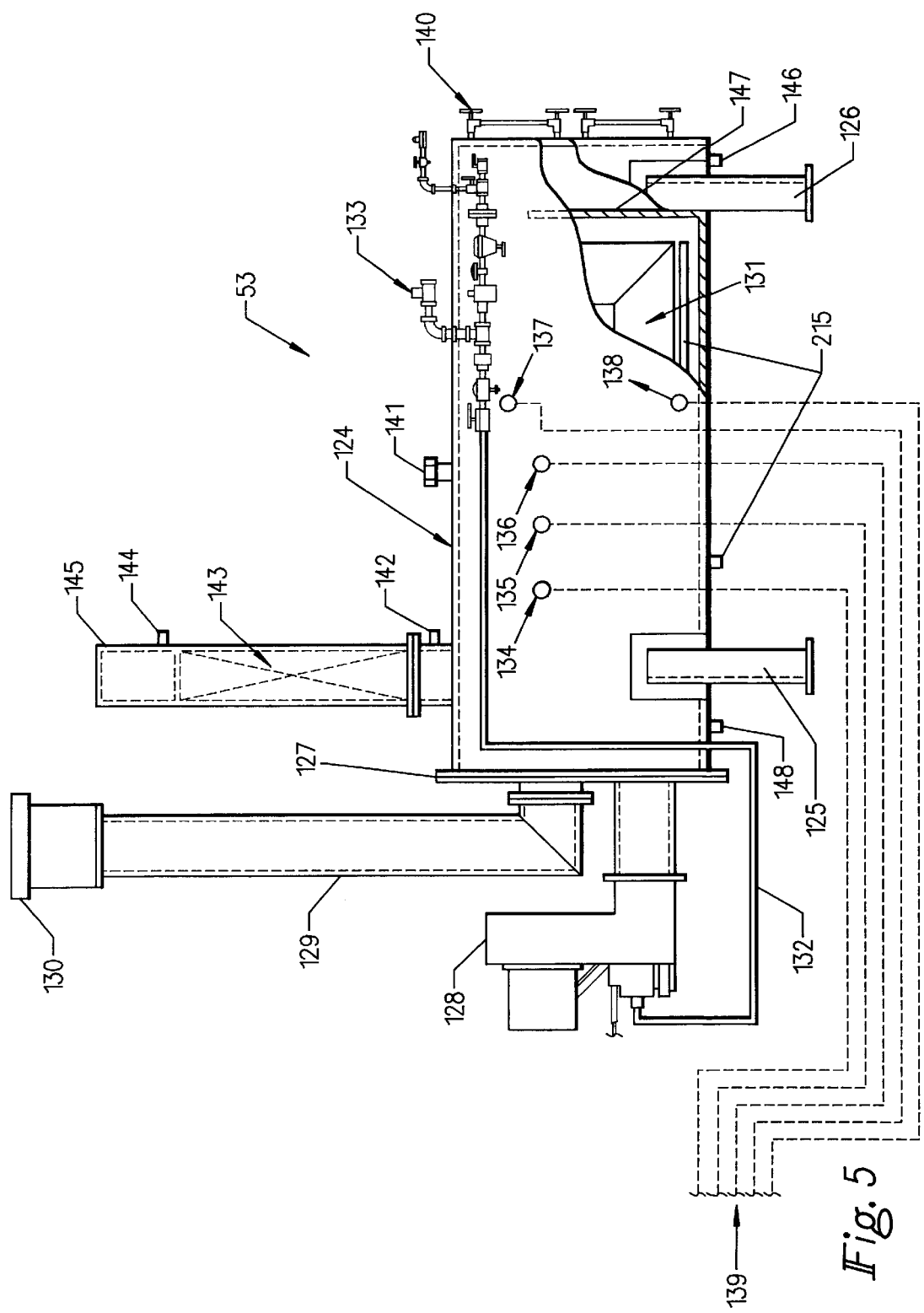
FIG. 5 is a side elevational view, partially cut away, illustrating the regenerator component of the deicing fluid recovery system according to the present invention.

With reference to FIG. 5, the deicing fluid regenerator 53 will now be described in greater detail. The regenerator 53 includes a substantially cylindrical tank 124 having a diameter of about eight feet and a length of about thirty feet and possessing a plurality of support legs 125 and 126. The tank 124 terminates at one end in a circular bulkhead 127 through which a burner assembly 128 is connected to a generally longitudinally extending fire tube 131. The fire tube 131 traverses in a closed loop through the tank 124, exiting the bulkhead 127 and terminating in an upwardly extending smokestack 129 capped by a down draft diverter 130. The burner 128 is coupled by a fuel supply line 132 with a natural gas fuel supply line 212 from source 26 (FIG. 1) via coupling 133 and conventional regulating equipment. The regenerator 53 is controlled electrically based upon high and low fluid level shut down parameters, as well as high and low temperature shut down parameters, via temperature gauge 134, high temperature shut down sensor 135, low temperature shut down sensor 136, high fluid level shut down sensor 137, and low fluid level shut down sensor 138, all of which are connected to control panel 65 (FIG. 2) by control lines 139. A sight glass assembly 140 allows manual direct observation of the fluid level within the tank 124. A fill cap 141 is provided for filling or flushing the tank 124, principally for periodically cleaning purposes. A drain plug 148 is also provided. The filtered, preheated, dilute deicing fluid mixture enters the regenerator 53 via inlet port 142 disposed at the base of a stripping column 145. The lower portion of the stripping column 145 internally contains six trays, each stacked with ceramic saddles 143 for the purpose of assuring that all water and deicing fluid vapor to be vented will come in contact with the cool wall of an atmospheric reflex condenser 145 located at the top of the stripping column 145. The ceramic saddles 143 are 1.5 inch curved bodies which provide greatly increased surface area to facilitate heat transfer and condensation. Suitable ceramic saddles are available from Koch Engineering of Houston, Tex. A water vapor condensate outlet 144 is disposed adjacent the top portion of the stripping column 145. In operation, the dilute deicing fluid mixture enters the stripping column 145 through the inlet 142 and travels through the internal ceramic saddles 143. During this period, the dilute deicing fluid mixture solution is rapidly heated to a boiling point, causing water and deicing fluid vapors to travel upwardly through the column 145. As the wet deicing fluid mixture enters through conduit 142, the mixture will immediately contact hot rising deicing fluid vapors and stripping gas (injected compressed air). Because the water has a lower boiling point than deicing fluid, any rising deicing fluid vapors will be condensed in the stripping column 145 and returned to the lower reboiler section within the tank 124. In the reboiler 124, the deicing fluid must travel a horizontal path along the tank 124, and over weir plate 147 to reach the liquid overflow conduit 146. In the fire box portion of the tank 124, the deicing fluid is heated between 260° F. to 290° F. to remove water vapor to reach a reconcentration level of 85% percent or more pure deicing fluid.

To dry the deicing fluid even further, stripping gas in the form of a small amount of compressed air is injected into the bottom of the tank 124 through a perforated spreader 215. This stripping air will slightly roll the deicing fluid in the reboiler tank 124 to allow any pockets of water vapor to escape, which might otherwise remain trapped in the deicing fluid due to its normal high viscosity. The injection of the stripping air will also aid in sweeping the water vapor out of the reboiler tank 124 and stripping column 145, thus lowering the partial pressure of the water vapor in the reboiler tank 124 and stripping column 145, allowing the deicing fluid to be concentrated to a higher percentage.

During the dehydration process in regenerator 53, the dilute pre-heated, but still relatively cold deicing fluid and water mixture initially enters to the left hand portion of tank 124, through inlet 142. The relatively cold mixture is more dense, and sinks to the bottom of tank 124. Removal of the water by stripping column 145 and fire tube 131 heats the leaner deicing fluid, causing it to rise. The injection of compressed air through spreader 215 causes the deicing fluid mixture to roll over, through and around the fire tube 131. Accordingly, by the time the deicing fluid spills over weir 147 to outlet 146, it is about 95% pure. The resultant lean deicing fluid overflows weir plate 147 and exists discharge conduit 146 travelling through an inlet 54 (FIG. 1) into an accumulator 55.

FIG. 6 illustrates a first alternative concrete pad 33 employed in conjunction with a plurality of interconnecting vertical 149 and generally horizontal 34 drainage lines for the collection of used deicing fluid and water deicing fluid, along with melted ice, freezing precipitation, and snow. The concrete pad 33 is preferably crowned as illustrated with a ⅛ inch: 1 foot slope in order to direct used deicing fluid by gravity flow through grates 150 and subsequently through drain line 34 to sump 36 (FIG. 1). As shown in FIG. 7, the grate 150 preferably covers a laterally extending trench 151 formed in the concrete pad 33. The grating 150 comprises a plurality of transversely extending connected metal bars 152 and 153 preferably formed from steel material and having a width of about 18 inches, a thickness of about three inches, with a spacing of ½ inches between bars. The grates 150 allow the deicing fluid and water mixture to drain therethrough, while preventing large solid materials such as rocks, leaves, chunks of ice, etc., from being inducted into the drain lines, resulting in contamination and potential clogging.

As illustrated in FIG. 9, a plurality of adjacent pads 33 may be employed in conjunction with a drainage system utilizing a plurality of drain gratings 150 along with fixed, jointed manipulator arms 154 coupled to deicing fluid outlets 30 for rapidly and uniformly spraying the deicing fluids through nozzles onto the wings, tail, and fuselage of aircraft. The dimensions of the pad 33 may be varied, along with the location of the gratings 150, to accommodate aircraft of various different types and sizes. In lieu of jointed manipulator arms 154, hook-ups may be provided for connection with conventional deicing tanker trucks.

FIGS. 10 through 12 illustrate a second alternative deicing fluid collection and distribution pad configuration 33', in which elongated collection trenches 151 are covered by elongated gratings 150. Inclined partial length 155 and full length 157 aprons, in conjunction with crowned pad surface 33', direct spent deicing fluid into trenches 151 and subsequently into vertical and lateral drains 149 and 34. As shown in FIG. 11, the angle of intersection between vertical 149 and lateral 34 drains may be varied to accommodate the slope of the terrain and the pad installation. This form of collection and distribution pad configuration is susceptible of retrofit installation on existing taxiways, with a minimum of expense and modification.

FIGS. 13 through 15 illustrate a third alternative collection and distribution pad construction, in which a run-up area pad 33" is centrally located on an existing taxiway section in which a plurality of lateral grooves 156 are cut for the purpose of draining spent deicing mixture into trenches 151 covered by gratings 150. Grooves 156 preferably possess a depth of about 0.5 inches and a width of about 0.125 inches.

Each of the various above-described alternative collection and distribution pad constructions allow for the unobstructed passage of aircraft along existing taxiways and other traffic areas. The distribution of the deicing fluid deicing solution can be conveniently accomplished by various different methods, including the illustrated jointed manipulator arms provided with spray nozzles, or through the use of conventional deicing trucks presently in the inventory of most airports. To allow the use of such existing trucks, it is presently preferred that stationary deicing fluid solution outlets be provided at each side of the run-up pad or that multiple truck fill-up points be disposed at the deicing location. This method allows the deicing collection and distribution pad to be free of obstructions during the months when deicing is not required, as well as reducing the cost of initial installation. A wide variety of other deicing fluid collection and draining arrangements may be employed, without departing from the scope of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A deicing fluid recovery system especially adapted for aircraft deicing apparatus, comprising:

storage means for storing and mixing a deicing fluid and water mixture;

application means for applying said deicing fluid and water mixture to an aircraft for deicing;

recovery means for recovering said deicing fluid and water mixture after said deicing application; and a regenerator for dehydrating said recovered deicing fluid and water mixture including:
   a reboiler tank for holding a quantity of said recovered deicing fluid and water mixture;
   heating means for heating said recovered deicing fluid and water mixture in said reboiler tank to a temperature above the boiling point of water;
   a stripping column in fluid communication with said reboiler tank;
   means operably associated with said stripping column for exhausting water;
   means for condensing deicing fluid vapor in said stripping column and returning said condensed deicing fluid to said reboiler; and
   means for returning dehydrated deicing fluid from said reboiler to said storage means;

means for selectively returning at least some of said water exhausted from said stripping column to said storage means dependent upon a sensed deicing fluid concentration level in said storage means; and make-up deicing fluid supply means for selectively adding deicing fluid to said storage means dependent upon a sensed deicing fluid concentration level in said storage means.

2. The deicing fluid recovery system of claim 1, wherein said recovery means includes a taxiway, lateral aprons disposed on opposite sides of said taxiway dimensioned to underlie wings of aircraft;

said application means including at least one manipulator arm on at least one of said aprons for applying deicing fluid to an aircraft;

at least one drainage trench extending adjacent a junction of at least one of said aprons and said taxiway, and said at least one apron and said taxiway contoured to direct used deicing fluid to said trench; and a plurality of closely spaced grooves extending transversely across said taxiway and communicating with said trench for draining used deicing fluid to said trench.

3. The deicing fluid recovery system of claim 1, wherein said recovery means includes a plurality of adjacent pads each dimensioned to receive an aircraft thereon;

a pair of drains in each pad disposed to at least partially underlie the wings of an aircraft on the pad; and a pivotal jointed manipulator arm disposed substantially centrally at intersections of sides of each adjacent pair of pads such that each manipulator arm may be selectively positioned to apply deicing fluid to an aircraft on either of the two adjacent pads.

4. The deicing fluid recovery system of claim 1, further comprising a concentration sensor in said storage means and control means operatively associated with said concentration sensor for (1) preventing discharge of deicing fluid mixture from said storage means when a deicing fluid component of said mixture falls above or below a predetermined minimum concentration, (2) supplying make-up deicing fluid to said storage means when a deicing fluid component of said mixture falls below said predetermined minimum concentration, (3) supplying water from said stripping column to said storage means when a water component of said mixture falls below a predetermined minimum concentration, and (4) diverting water from said stripping column to a drain when a water component of said mixture exceeds a predetermined maximum concentration; and stirring means in said storage means for maintaining a homogenous mixture.

5. The deicing fluid recovery system of claim 1, wherein said application means includes at least one fluid coupling for connection to a conventional deicing tanker truck.

6. The deicing fluid recovery system of claim 1, wherein said application means includes at least one manipulator arm for applying deicing fluid to an aircraft.

7. The deicing fluid recovery system of claim 1, wherein said recovery means includes at least one drain in a taxiway.

8. The deicing fluid recovery system of claim 7, wherein said taxiway includes lateral aprons dimensioned to underlie wings of aircraft.

9. The deicing fluid recovery system of claim 8, wherein said application means includes at least one manipulator arm on at least one of said aprons for applying deicing fluid to an aircraft.

10. The deicing fluid recovery system of claim 8, wherein at least one drainage trench extends adjacent a junction of at least one of said aprons and said taxiway, and said at least one apron is contoured to direct used deicing fluid to said trench.

11. The deicing fluid recovery system of claim 10, wherein said taxiway is also contoured to direct used deicing fluid to said trench.

12. The deicing fluid recovery system of claim 11, wherein said taxiway is crowned and said apron is inclined.

13. A deicing fluid recovery system especially adapted for aircraft deicing apparatus, comprising:

at least one storage tank for storing a deicing fluid and water mixture;

an applicator for applying said deicing fluid and water mixture to an aircraft for deicing;

a drain system for recovering said deicing fluid and water mixture after said deicing application;

a regenerator for removing water from said recovered deicing fluid and water mixture and for returning dehydrated deicing fluid to said storage tank;

means for selectively returning at least some of said water from said regenerator to said storage tank dependent upon a sensed deicing fluid concentration level in said storage tank;

a make-up deicing fluid supply tank and means for selectively adding deicing fluid to said storage tank dependent upon a sensed deicing fluid concentration level in said storage tank; and a heat exchanger utilizing dehydrated deicing fluid from said regenerator as a heat source prior to return of said dehydrated deicing fluid to said storage tank to pre-heat recovered dilute deicing fluid prior to passage to said regenerator.

14. The deicing fluid recovery system of claim 13, wherein said recovery means includes a taxiway, lateral aprons disposed on opposite sides of said taxiway dimensioned to underlie wings of aircraft;

said application means including at least one manipulator arm on at least one of said aprons for applying deicing fluid to an aircraft;

at least one drainage trench extending adjacent a junction of at least one of said aprons and said taxiway, and said at least one apron and said taxiway contoured to direct used deicing fluid to said trench; and a plurality of closely spaced grooves extending transversely across said taxiway and communicating with said trench for draining used deicing fluid to said trench.

15. The deicing fluid recovery system of claim 13, wherein said application means includes at least one fluid coupling for connection to a conventional deicing tanker truck.

16. The deicing fluid recovery system of claim 13, wherein said application means includes at least one manipulator arm for applying deicing fluid to an aircraft.

17. The deicing fluid recovery system of claim 13, wherein said recovery means includes a plurality of adjacent pads each dimensioned to receive an aircraft thereon;

a pair of drains in each pad disposed to at least partially underlie the wings of an aircraft on the pad; and a pivotal jointed manipulator arm disposed substantially centrally at intersections of sides of each adjacent pair of pads such that each manipulator arm may be selectively positioned to apply deicing fluid to an aircraft on either of the two adjacent pads.

18. The deicing fluid recovery system of claim 17, further comprising a concentration sensor in said storage means and control means operatively associated with said concentration sensor for (1) preventing discharge of deicing fluid mixture from said storage means when a deicing fluid component of said mixture falls below a predetermined minimum concentration, (2) supplying make-up deicing fluid to said storage means when a deicing fluid component of said mixture falls below said predetermined minimum concentration, (3) supplying water from said stripping column to said storage means when a water component of said mixture falls below a predetermined minimum concentration, and (4) diverting water from said stripping column to a drain when a water component of said mixture exceeds a predetermined maximum concentration; and stirring means in said storage means for maintaining a homogenous mixture.

19. The deicing fluid recovery system of claim 18, wherein said application means includes at least one manipulator arm on at least one of said aprons for applying deicing fluid to an aircraft.

20. A deicing fluid recovery system especially adapted for aircraft deicing apparatus, comprising:

(a) storage means for storing a deicing fluid and water mixture;

(b) application means for applying said deicing fluid and water mixture to an aircraft for deicing;

(c) recovery means for recovering said deicing fluid and water mixture after said deicing application;

(d) a settling and filtration tank for pre-treating recovered dilute deicing fluid;

(e) a regenerator for dehydrating said recovered deicing fluid and water mixture, said regenerator including:

(1) a reboiler tank for holding a quantity of said recovered deicing fluid and water mixture;

(2) heating means for heating said recovered deicing fluid and water mixture in said reboiler tank to a temperature above the boiling point of water;

(3) a stripping column in fluid communication with said reboiler tank;

(4) means for injecting a stripping gas into said reboiler tank to facilitate separation of water vapor from deicing fluid;

(5) a perforated spreader for distributing said stripping gas in said reboiler tank;

(6) means operably associated with said stripping column for exhausting water;

(7) means for condensing deicing fluid vapor in said stripping column and returning said condensed deicing fluid to said reboiler; and (8) a lean deicing fluid drain in said reboiler tank and an overflow weir in said reboiler tank disposed such that deicing fluid must flow over said weir to reach said drain;

(f) means for returning dehydrated deicing fluid from said lean deicing fluid drain to said storage means;

(g) means for selectively returning at least some of said water exhausted from said stripping column to said storage means dependent upon a sensed deicing fluid concentration level in said storage means;

(h) make-up deicing fluid supply means for selectively adding deicing fluid to said storage means dependent upon a sensed deicing fluid concentration level in said storage means; and (i) a heat exchanger utilizing dehydrated deicing fluid from said regenerator as a heat source prior to return of said dehydrated deicing fluid to said storage means to pre-heat recovered dilute deicing fluid prior to passage to said regenerator.

* * * * *